No. 839,068. PATENTED DEC. 18, 1906.
W. T. KAMMANN.
MOTOR VEHICLE.
APPLICATION FILED MAR. 30, 1904.
3 SHEETS—SHEET 1.
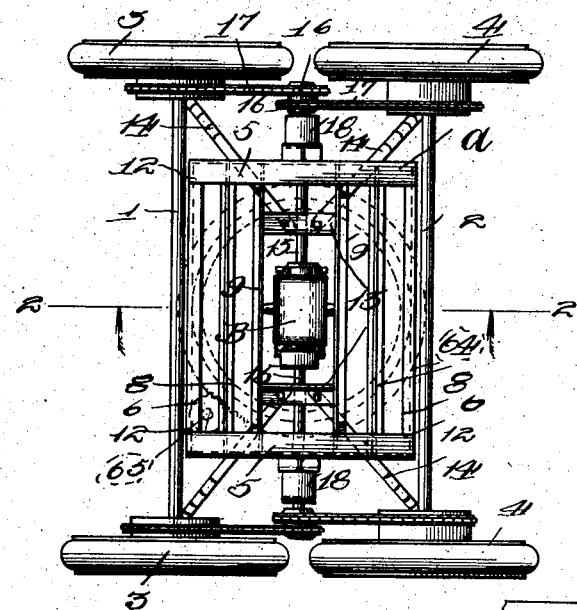
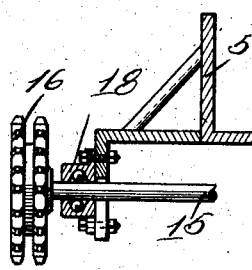
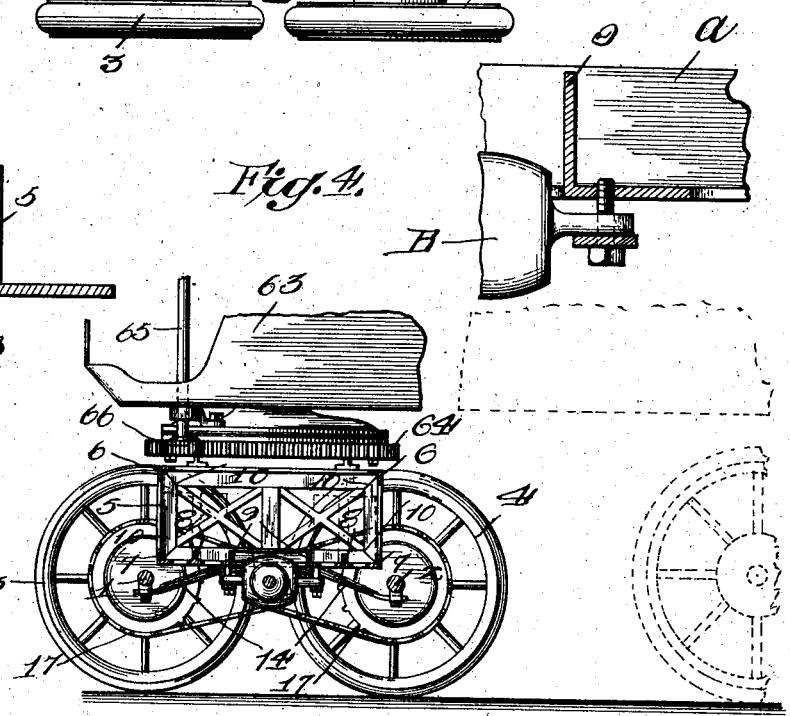
Witnesses:
Cl. V. Domarus.
J. C. Lee
Inventor:
Wm. T. Kammann
by A. Miller Redfield
Attorney No. 839,068. PATENTED DEC. 18, 1906.
W. T. KAMMANN.
MOTOR VEHICLE.
APPLICATION FILED MAR. 30, 1904.
3 SHEETS—SHEET 2.
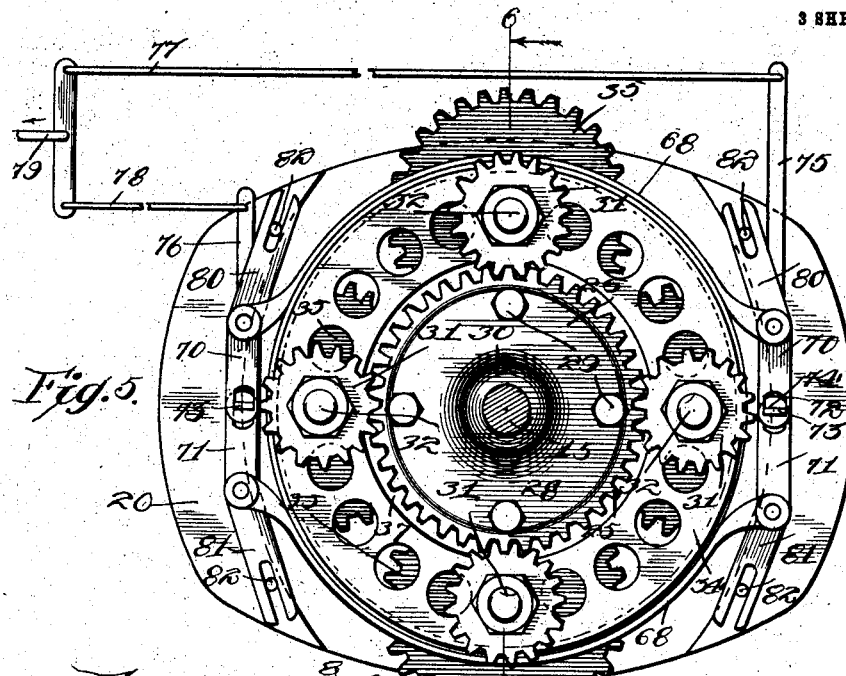
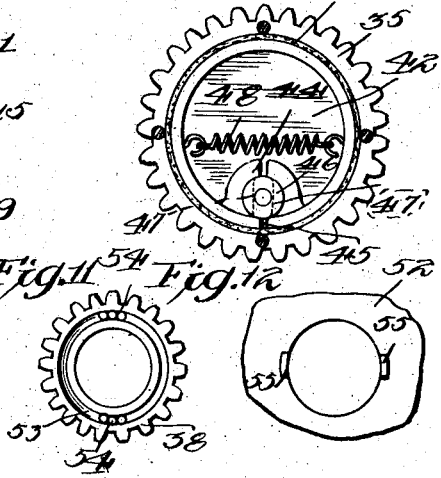
Witnesses:
Inventor:
Wm. T. Kammann
by A. Miller Riepold
Attorney No. 839,068. PATENTED DEC. 18, 1906.
W. T. KAMMANN.
MOTOR VEHICLE.
APPLICATION FILED MAR. 30, 1904.

3 SHEETS—SHEET 3.

Witnesses:
G. V. Domarus
J. C. Lee

Inventor.
Wm. T. Kammann
by A. Miller Sefield
Attorney.

UNITED STATES PATENT OFFICE.

WILLIAM T. KAMMANN, OF CHICAGO, ILLINOIS.

MOTOR-VEHICLE.

No. 839,068.   Specification of Letters Patent.   Patented Dec. 18, 1906.

Application filed March 30, 1904. Serial No. 200,773.

*To all whom it may concern:*

Be it known that I, WILLIAM T. KAMMANN, a citizen of the United States, residing at Chicago, in the county of Cook and State of Illinois, have invented a certain new and useful Improvement in Motor-Vehicles, of which the following is a full, clear, concise, and exact description, reference being had to the accompanying drawings, forming a part of this specification.

My invention relates to automobiles.

Prominent objects of the invention are to provide a simple and practical construction of truck-frame; to provide a power driving mechanism particularly adapted for heavy freight vehicles or trucks to permit the ready transformation of an ordinary vehicle into an automobile or power-driven vehicle; to arrange for the application of the power in different ways, so as to secure different results—as, for example, slow speed with great power or high speed with less power—and to accomplish the foregoing in a simple, practical, and expeditious manner.

Figure 7:
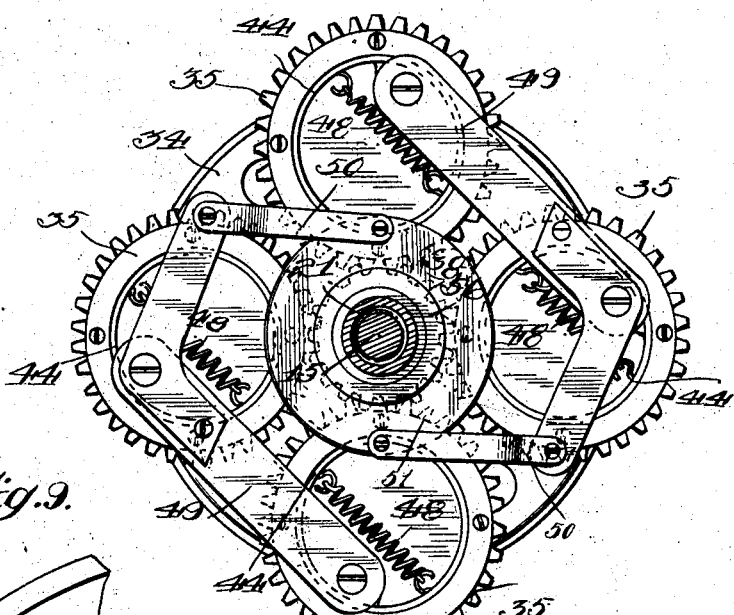
Figure 9:
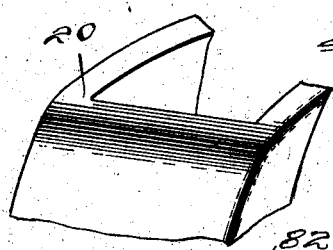
Figure 8:
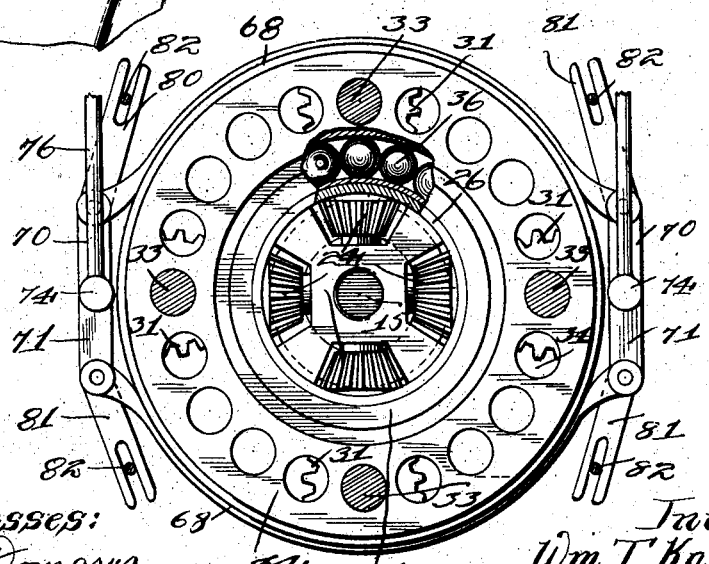

In the accompanying drawings, Figure 1 is a plan view of a truck or fore-carriage for automobiles embodying my present invention. Fig. 2 is a cross-section taken on line 2 2 in Fig. 1. Figs. 3 and 4 are views of details of construction. Fig. 5 is a side elevation of a motor and driving-gear which permits different applications of power. Fig. 6 is a cross-section taken on line 6 6 in Fig. 5. Figs. 7 and 8 are sections taken on lines 7 7 and 8 8 in Fig. 6. Figs. 9 to 12, inclusive, are views of details of construction.

In Fig. 1 I have shown a truck or fore-carriage especially adapted for use in a freight motor-vehicle, meaning by a "truck" the front wheels and associated frame which form the front part of the running-gear of the vehicle. In Fig. 4 I have also shown the front part of the body of the vehicle and have indicated in dotted lines more of the body part and the rear wheels of the vehicle.

The truck of my present invention is intended to be bodily attached to and detached from a vehicle, so that when desired a vehicle of ordinary construction can have its front wheel removed and one of my trucks substituted, thus transforming an ordinary vehicle into a motor-vehicle or automobile. To such end the truck proper—that is, the wheels, with their framework—is provided with a driving-motor and driving mechanism and gearing, so that the entire apparatus forms a separate unit complete in itself, capable, therefore, of bodily attachment to and detachment from the vehicle and also capable of operating to drive the same when properly attached. The truck shown in the drawings for carrying out this invention comprises a body or supporting-frame A and a pair of axles 1 and 2, provided with wheels 3 3 and 4 4, respectively. The frame A could be of any suitable or desired construction, but as a matter of further and specific improvement is made in a general rectangular box-like form conveniently consisting of a pair of rectangular ends 5 5 and connecting-braces 6 6, 7 7, 8 8, and 9 9. The ends 5 5 are conveniently made of a suitable length of angle-iron bent to form a square structure, as shown in Fig. 4, the ends of the iron being welded together and its inner flange having portions cut away, so that when the bar is bent into the form shown the edges of the cut-away portions will meet in lines 10 10. The upper braces 6 6 and lower braces 7 7 are desirably made of angle-irons which are welded to the ends 5 5. The horizontal flanges of these bars are cut away at 12 12, Fig. 1. The lower braces 8 8 are desirably made of T-irons, the horizontal flanges of which are likewise cut away and welded to the ends 5 5. The braces 9 9 are desirably made of angle-bars whose horizontal flanges are similarly cut away. By such construction the lower braces 7, 8, and 9 form four distinct passages or shelves, two on each side, each adapted to accommodate a row of storage batteries, as shown in dotted lines in Fig. 4. A pair of cross-braces 13 13, conveniently in the form of angle-bars, are extended between the inner braces 9 9, as shown in Fig. 1. Springs 14 14 are extended from the outer ends of the axles 1 and 2 to the braces 13 13, to which the inner ends of said springs are secured. The springs are also desirably secured to the middle braces 9 9.

An electric motor B is shown mounted at the middle of the frame A, and rotary shafts 15 15 are extended out from the motor and provided at their outer ends with sprocket-wheels 16 16, from which sprocket-chains 17 17 extend to sprocket-wheels on the wheels 3 4 for driving the latter. The motor B is conveniently supported from the bottom of the frame A, as shown in Fig. 4, and suitable bearings 18 18 are provided for the shafts 15

15. Although the motor shown is an electric motor, any other form of motor can be used.

My present invention further contemplates a gearing or driving mechanism by which the motor, be it electrical or otherwise, can be employed, so that its power will be used to best advantage under different conditions. The arrangement herein set forth permits the power to be applied directly from the motor and also reduced by gearing, whereby the vehicle can be driven at a relatively high speed by the direct application of power where the load is comparatively light and there are no grades, and also whereby the vehicle can be driven at a reduced speed where the load is heavy or there are upgrades. The arrangement herein shown for this purpose is best shown in Figs. 5 to 12, inclusive. Referring first to Fig. 6, a part 20 of the motor-casing is shown, as also the motor-shaft 21. The driving-shafts 15 15 for the vehicle-wheels are also shown in this figure, one of them being extended through the motor-shaft 21, which is for such purpose made hollow. A sleeve 22 is fitted within the shaft 21 and outside of the shaft 15 therein to form a bearing for the latter. The driving-shafts 15 15 are provided with bevel-wheels 23 23, which by coöperating with four bevel-wheels 24 24, arranged between them, form a differential gearing. The gear-wheels 24 24 are carried by a large gear-wheel 25, which is provided with an annular extension 26, in which pins 27 27, forming spindles for the wheels 24 24, are inserted. A frame 28 is bolted to the gear 25 by bolts 29 and is provided with an elongated extension 30, which forms a bearing for one of the driving-shafts 15. A plurality of gear-wheels 31 31 (four being shown) are mounted on spindles 32 32 and arranged to mesh with the gear 25. The spindles 32 32 are enlarged at 33 33, and these enlarged portions are extended through apertures formed in a rotary annulus or ring 34 and are carried by larger gear-wheels 35 35, with which said spindles are desirably made integral. The annulus 34 is mounted on balls 36 36, which, with a sleeve 37, screwed on the extension 26 of the gear 25, form a suitable ball-bearing for said annulus. The gear-wheels 35 35 mesh with a central gear or pinion 38, which is keyed to the motor-shaft 21 by a key 39. A collar 40 is mounted on the screw-threaded end of the motor-shaft 21, and a ring 41 is mounted outside of the collar 40, the collar 40 holding the ring 41 and gear 38 in place. The gears 35 35 are made of a chambered or hollow construction, as shown in Fig. 6, and friction-drums 42 42, Fig. 10, are confined within them, with layers 43 43, of friction material, such as leather, interposed between the outer rims of the friction-drums and the inner rims of the gear-wheels. The friction-drums 42 42 are constructed with interior projections or lugs 44 44, which are split, the corresponding portions of the rims of the disks being also split, as at 45. Plugs 46 46, having flat sides or faces 47 47, are fitted into the lugs 44 44, and springs 48 48 are arranged within the rims of the friction-disks and adapted to contract the same to lessen their diameters. Levers 49 49 are secured to the projecting ends of the plugs 46 46, as shown in Figs 6 and 7. The levers 49 49, of which there are two, are of general rectangular or bell-crank form, and each lever is connected with two of the plugs 46 46, one at the free end of each lever and the other at the bend or angle thereof, as shown in Fig. 7. Links 50 50 are pivotally connected to the other free end of the levers 49 49 and extended inwardly and pivotally connected at their inner ends with a disk 51, loosely mounted on an extension 52 of the small central gear 38. The gear 38 is provided with an annular groove or channel 53, Fig. 11, which is closed at opposite points by pins or pegs 54 54. The disk 51 is provided with two oppositely-disposed projections 55 55, which are adapted to fit and work in the channel 53 in the gear 38. The disk 51 is also constructed with an annular lip or flange 56, and in this is mounted a loose collar 57, to which is secured a lever 58, pivoted to the motor-casing at 59. The lever 58 is subjected to a pulling-spring 60, which tends to draw the lever so as to force the collar 57 against the disk 51. An operating-rod 61 is also secured to the upper end of the lever 58, by which said lever can be actuated by the operator of the vehicle.

The operation of the arrangement thus set forth is as follows: Under ordinary conditions the motor drives the shafts 15 15 directly by reason of the positive and direct locking action, which is under normal conditions formed between the motor-shaft 21 and such shafts 15 15. This is due to the fact that under such conditions the spring 60 by drawing on the lever 58 causes the collar 57 to normally hold the disk 56 in an extended or inward position, in which its prongs 55 55 engage the pins 54 54 on the gear 38, the gear 38 thereby being locked with the disk 56. As a result, the rotation of the shaft 21 with the gear 38 causes the disk 51 to turn with it, the initial turning movement of which draws upon or tightens the links 50 50, thereby causing said links to act to draw inwardly upon the ends of the levers 49 49, to which they are connected. These levers are thereby slightly turned, so that the plugs 46 46, to which they are secured, are also slightly turned, thereby inclining the flat surfaces 47 47 thereof to a slight extent and causing the opening or expansion of the friction-drums 42 42. As a result, these drums bind upon the gear-wheels 35 35 and prevent the rotary movement of the same. These gears 35 35 being locked, the gears 31 31 are therefore locked, and the latter act directly to force a rotation of the gear 25 by the force which the gears 31 31 exert directly upon the gear 25 while in their locked condition—that is to say, there being no rotation of the gears 31 31. The gear 25 on being rotated in this way carries the pinions 24 24 with it, thereby causing these pinions to turn the gears 23 23, and thereby the shafts 15 15, the pinions 24 24 not revolving upon their own axes except to permit a slight turning of the wheels on the opposite sides of the vehicle, as required in turning corners and the like. Thus, in effect, the motor is ordinarily and normally locked to the driving-shafts of the truck, so that its power is applied directly to such shafts to turn them in correspondence with the rotation of the motor. The rotation of these shafts of course drives the truck-wheels 3 4 through the medium of the sprocket-chains 17 17. When it is desired to apply the motive power so that the motor can exert more power on the wheels, the lever or rod 61 is pushed in the direction indicated by the arrow in Fig. 6, thereby causing the collar 57 to withdraw the disk 51 out of engagement with the gear-wheel 38. The links 50 50 thereby become released, relaxing their tension upon the levers 49 49, so that the plugs 46 46 are allowed to resume a more radial position and permit the friction-drums 42 42 to contract and discontinue their frictional engagement with the gear-wheels 35 35. The rotation of the pinion 38, therefore, is permitted to turn the gears 35 35 on their axes, and they in turn rotate the pinions 31 31 on their axis, so that these pinions by their rotation can turn the gear 25, and thereby drive said gear and the rotary shafts 15 15, as before. The annulus 34 being loose and free and the gear 25 being held against rotation by the load, the annulus, with the pinions 31 31, will naturally revolve around the gear 25 instead of driving the latter. A braking arrangement is therefore provided for holding the annulus 34 against rotation, and thereby compelling the pinions 31 31 to turn the gear 25. This comprises a pair of metal straps 68 68, provided with friction-straps 69 69, securely attached thereto, and these friction elements are arranged the one above and the other below the annulus 34. The ends of the upper friction-strap are connected with links 70 70 and those of the lower strap with links 71 71. The links 70 70 and 71 71 are provided with apertures 72 72, and into these are fitted the flat ends or extensions 73 73 of a pair of heads 74 74, which are secured to, being conveniently made integral with, rods 75 and 76, which latter are provided with links 77 and 78, respectively, connected to an operator's brake-rod 79. Rods 80 80 are pivotally connected with the upper links 70 70 and rods 81 81 with the lower links 71 71, and these rods 80 and 81 are forked at their outer or free ends. Their forked ends receive and engage pins 82 82, fixed to the motor-casing. The operation of this braking device is as follows: When the operator's braking-rod 79 is drawn in the direction of the arrow, Fig. 5, the links 75 76 turn the heads 74 74 slightly, with the result that the flat extensions 73 thereof move the links 70 70 and 71 71 toward one another—that is, the links 70 70 are depressed and the links 71 71 elevated. This tightens the friction-bands 68 68 upon the annulus 34 to an extent to cause said bands to be moved slightly by the annulus in rotating. One of the links 80 and one of the links 81, depending on the direction of rotation of the annulus 34, are therefore moved toward and thrown against the corresponding pins 82 82, with the result that this movement of the straps with the annulus is brought to a stop. The friction-bands therefore exert a friction upon the annulus, and since this is increased as the pressure against the stops 82 82 increases a very powerful friction effect is exerted upon said annulus, thereby checking and finally stopping its rotation, with the result that the gear 25 and shafts 15 15 are rotated as in the other previously-described arrangement.

The braking-rod 79 is understood to be led forwardly and properly connected with a lever or other contrivance to be operated by the operator of the vehicle. The usual proceeding is to start up the motor and allow it to attain some speed without driving the vehicle and then to operate the brake-rod 79 so as to brake the revolving annulus 34 and start and run the vehicle. The rod 79 thus becomes the starting and stopping or speed-controlling rod, and by suitably actuating it the vehicle can be started and stopped and have its speed regulated as desired. The rod 61 is also understood to be extended properly and connected with a hand-lever or other contrivance for the operator, so that the latter can while sitting upon his seat throw the reduction-gearing into and out of operation at will. Thus the operator can whenever he desires change the application of power of the motor so as to apply it either directly to the wheel-driving shafts, or indirectly thereto, through the medium of a reduction-gearing. The reduction-gearing is of course ordinarily brought into play when the vehicle is to climb an incline or hill and when traveling over rough roads. The more direct driving arrangement is used when a greater speed is desired and when traveling over level roads. Ordinarily in starting the vehicle the reduction-gearing is used, and then the more direct gearing is employed, so as to increase its speed. Then when a hill or other incline is to be climbed the reduction-gearing is again thrown into play, reducing the speed of the vehicle and increasing the power applied to the wheels.

It will be seen that the truck thus described comprises a suitable and proper framework, together with self-contained driving mechanism by which its wheels can be properly driven and with the advantage that they can be applied either for straight work or hill-climbing at will. This self-contained truck or fore-carriage is shown in Fig. 4 arranged below the front part of the body 63 of the vehicle and provided with a fifth-wheel arrangement by which it can be turned relatively to the vehicle-body. The truck or fore-carriage is provided with a large annular gear 64, fastened to the portion of the fifth-wheel on the fore-carriage, and the vehicle-body with a rod 65, having a pinion 66, the rod being extended up through the floor of the vehicle-body, so as to permit it to be operated by an operator.

Changes and modifications can be made in the devices herein set forth without departing from the spirit of my invention.

What I claim is—

1. A detachable track for motor-vehicles, comprising the two sets of rigidly-mounted wheels and driving mechanism combined to form a unitary structure capable of bodily attachment to and detachment from a vehicle in combination with means on the vehicle for controlling said driving mechanism, substantially as described.

2. A detachable truck for motor-vehicles, comprising double sets of rigidly-mounted wheels, a running-gear therefor, and driving mechanism, the latter being combined and united to form a bodily detachable and attachable unitary structure, substantially as described.

3. A truck for motor-vehicles, comprising two sets of rigidly-mounted wheels, a running-gear, a motor supported thereby, and mechanism for driving the wheels by the motor, the whole being combined to form a single unitary structure capable of bodily attachment to and detachment from the vehicle in combination with means on the vehicle for controlling the motor and running-gear, substantially as described.

4. A truck for motor-vehicles, comprising front and rear rigidly-mounted wheels, a running-gear, a motor carried thereby, driving-shafts actuated by said motor, and power-driven connections between the wheels and driving-shafts, substantially as described.

5. A truck for motor-vehicles, comprising front and rear axles provided with wheels, a frame supported by said axles and consisting of ends united by cross-strips, a motor supported by said frame, driving-shafts actuated by said motor, and gear connections between said shafts and wheels, substantially as described.

6. A truck for motor-vehicles, comprising front and rear axles provided with wheels, and a frame consisting of ends formed of angle-bars having their ends welded together and cross-strips consisting of angle and T-shaped bars welded to said ends, substantially as described.

7. In a motor-vehicle, a truck-frame comprising ends 5, 5 each formed of a single length of angle-bar bent into rectangular form and having its ends welded together, and cross-strips 6 6, 7 7, 8 8 and 9 9, the strips 6 6, 7 7 and 9 9 being angle-bars, and the strips 8 8 being T-shaped bars located between the strips 7 7 and 9 9, substantially as described.

In witness whereof I hereunto subscribe my name this 28th day of March, A. D. 1904.

WILLIAM T. KAMMANN.

Witnesses:
A. MILLER BELFIELD,
I. C. LEE.